United States Patent
Shestak et al.

(10) Patent No.: US 8,194,058 B2
(45) Date of Patent: Jun. 5, 2012

(54) METHOD OF DRIVING LIQUID CRYSTAL POLARIZATION SWITCH

(75) Inventors: Sergey Shestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1122 days.

(21) Appl. No.: 12/045,403

(22) Filed: Mar. 10, 2008

(65) Prior Publication Data

US 2008/0239176 A1 Oct. 2, 2008

Related U.S. Application Data

(60) Provisional application No. 60/907,215, filed on Mar. 26, 2007.

(30) Foreign Application Priority Data

Jun. 26, 2007 (KR) .......... 10-2007-0063133

(51) Int. Cl.
*G09G 5/00* (2006.01)

(52) U.S. Cl. ............ 345/204; 345/691; 348/51; 349/33; 359/462

(58) Field of Classification Search .......... 345/204, 345/419, 691, 697, 32; 349/15, 33, 96; 348/42, 348/51; 352/57; 359/246, 290, 376, 462, 359/465

See application file for complete search history.

(56) References Cited

U.S. PATENT DOCUMENTS

| | | | |
|---|---|---|---|
| 6,448,952 B1 * | 9/2002 | Toyoda et al. | 345/97 |
| 7,327,410 B2 * | 2/2008 | Cho et al. | 349/15 |
| 8,040,371 B2 * | 10/2011 | Kim et al. | 348/51 |

\* cited by examiner

*Primary Examiner* — Abbas Abdulselam
(74) *Attorney, Agent, or Firm* — Sughrue Mion, PLLC

(57) ABSTRACT

A method of driving a polarization switch is provided. First viewing point images and second viewing point images are alternately displayed in a time-divisional method. A voltage is applied to the polarization switch during an activation period, and no voltage or a bias voltage is applied to the polarization switch during a relaxation period. The activation period is shorter than the relaxation period, and the bias voltage is smaller than the applied voltage.

13 Claims, 9 Drawing Sheets

METHOD OF DRIVING LIQUID CRYSTAL POLARIZATION SWITCH

CROSS-REFERENCE TO RELATED PATENT APPLICATIONS

This application claims priority from U.S. Provisional Application No. 60/907,215, filed on Mar. 26, 2007 in the U.S. Patent and Trademark Office, and Korean Patent Application No. 10-2007-0063133, filed on Jun. 26, 2007 in the Korean Intellectual Property Office, the disclosures of which are incorporated herein in their entirety by reference.

BACKGROUND OF THE INVENTION

1. Field of the Invention

Apparatuses and methods consistent with the present invention relate to driving a polarization switch, and more particularly, to driving a polarization switch to improve the quality of images displayed by a stereoscopic image display apparatus that includes a liquid crystal display (LCD) panel and a liquid crystal polarization switch.

2. Description of the Related Art

A polarization switch is a device for changing a polarization direction of incident light thereon based on electric control. Related art polarization switches include a transparent electro-optic layer provided between transparent substrates. For example, the electro-optic layer used in the polarization switch can be a liquid crystal layer.

FIG. 1 shows a schematic structure of a related art liquid crystal polarization switch 10. Referring to FIG. 1, the polarization switch 10 includes two transparent substrates 11 and 17, transparent electrodes 12 and 16 formed on surfaces of the substrates 11 and 17, respectively, which face each other, liquid crystal arrangement layers 13 and 15 which initially arrange the liquid crystal, and a liquid crystal layer 14 filled between the two transparent substrates 11 and 17. The polarization switch 10 with the above structure can be designed so that the polarization direction of light transmitted through the polarization switch 10 is not changed when a maximum voltage is applied to the transparent electrodes 12 and 16, and the polarization direction of the light transmitted through the polarization switch 10 is changed by a 90° angle when no voltage is applied to the transparent electrodes 12 and 16.

The polarization switch can be effectively used to provide left eye images and right eye images with different polarization directions from each other in a time-divisional stereoscopic image display apparatus. FIG. 2 shows an example of a polarizing eyeglasses-type time-divisional stereoscopic image display apparatus which includes the above polarization switch. The time-divisional stereoscopic image display apparatus displays left eye images and right eye images on the entire screen at very fast intervals, and at the same time, separately provides the left eye and the right eye with the images in synchronization with the display intervals of the left eye images and the right eye images. Referring to FIG. 2, the stereoscopic image display apparatus 20 includes a display panel 21 which displays images, a polarization plate 22, a polarization switch 23, a pulse generator 24 for driving the polarization switch 23, and polarizing eyeglasses 25.

The display panel 21 displays the left eye images and the right eye images alternately in frame units. The polarization plate 22 polarizes the image provided from the display panel 21 at a 45° angle. The polarization switch 23 does not change the polarization direction of the incident light when the voltage is applied, and changes the polarization direction of the incident light by a 90° angle when the voltage is not applied.

The pulse generator 24 generates pulse signals that are synchronized with the displaying periods of the left eye images and the right eye images, and sends the pulse signals to the polarization switch 23. The polarizing eyeglasses 25 include a left eye polarizer 25a having a polarization direction at a 135° angle, and a right eye polarizer 25b having a polarization direction at a 45° angle.

In the above structure, while the display panel 21 displays the left eye image, a low level pulse is applied to the polarization switch 23. Then the light transmitted through the polarization plate 22 and the polarization switch 23 is polarized at a 135° angle, and the image is only transmitted through the left eye polarizer 25a of the polarizing eyeglasses 25. In addition, while the display panel 21 displays the right eye image, a high level pulse is applied to the polarization switch 23. Then the light transmitted through the polarization plate 22 and the polarization switch 23 is polarized at a 45° angle, and the image is transmitted only through the right eye polarization plate 25b of the polarizing eyeglasses 25.

The related art pulse generator 24 provides the polarization switch 23 with pulses with a 50% duty cycle. That is, when a period of the pulse supplied to the polarization switch 23 is T, the period with a high level (T1) and the period with a low level (T2) are each equal to T/2. However, a response speed when the liquid crystal transits from the low level to the high level is faster than a response speed when the liquid crystal transits from the high level to the low level. Therefore, where the polarization switch 23 and the display panel 21 both use the liquid crystal, the intensities of lights recognized by the left eye and the right eye are different from each other, and cross-talks recognized by the left eye and the right eye are different from each other.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of driving a polarization switch which equalizes light intensities and cross-talk recognized by the left eye and the right eye in a time-divisional stereoscopic image display apparatus that displays high-quality images.

The present invention also provides a time-divisional stereoscopic image display apparatus with the same light intensities and the same cross-talk recognized by the left eye and the right eye.

According to an aspect of the present invention, there is provided a method of driving a polarization switch in a display apparatus which alternately displays first viewing point images and second viewing point images in a time-divisional manner. The method includes applying a voltage to the polarization switch during an activation period, and applying no voltage to the polarization switch or applying a bias voltage to the polarization switch during a relaxation period. The activation period is shorter than the relaxation period, and the bias voltage is smaller than the applied voltage.

The total period includes the activation period and the relaxation period, and may be equal to a period of displaying a frame of the first viewing point image and a frame of the second viewing point image.

A beginning of the activation period may be synchronized with a start of displaying the first viewing point image, the activation period ends and the relaxation period may begin before an end of displaying the first viewing point image, and an end of the relaxation period may be synchronized with an end of displaying the second viewing point image.

The activation period and the relaxation period of the polarization switch may be selected so that an average light intensity recognized by the left eye of a viewer equals an average light intensity recognized by the right eye of the viewer.

The activation period and the relaxation period of the polarization switch may be selected so that an average cross-talk recognized by the left eye equals an average cross-talk recognized by the right eye.

The polarization switch may be a liquid crystal polarization switch.

According to another aspect of the present invention, there is provided a display apparatus including: a display panel which alternately displays first viewing point images and second viewing point images in a time-divisional manner; a polarization switch which provides the first viewing point images and the second viewing point images with different polarization directions from each other; and a pulse generator which generates a driving voltage which drives the polarization switch. An activation period in which a voltage is applied to the polarization switch is shorter than a relaxation period in which no voltage is applied or a bias voltage is applied to the polarization switch. The bias voltage is smaller than the applied voltage.

The display panel may be a hold-type display panel.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 3:
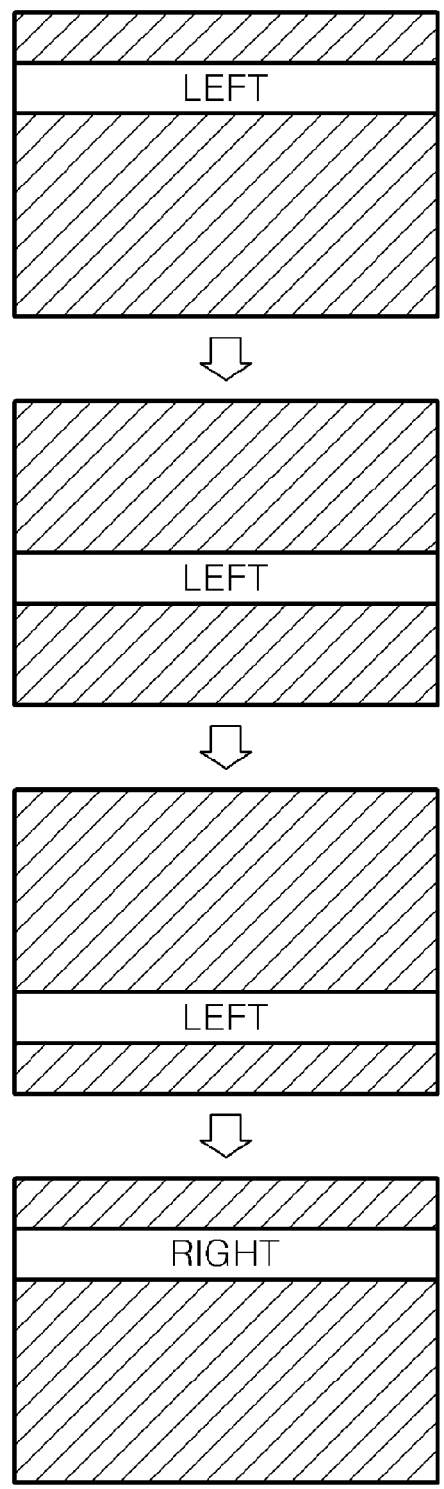
FIG. 3 illustrates processes of displaying left eye images and right eye images in a related art cathode ray tube (CRT) display apparatus.
Figure 4:
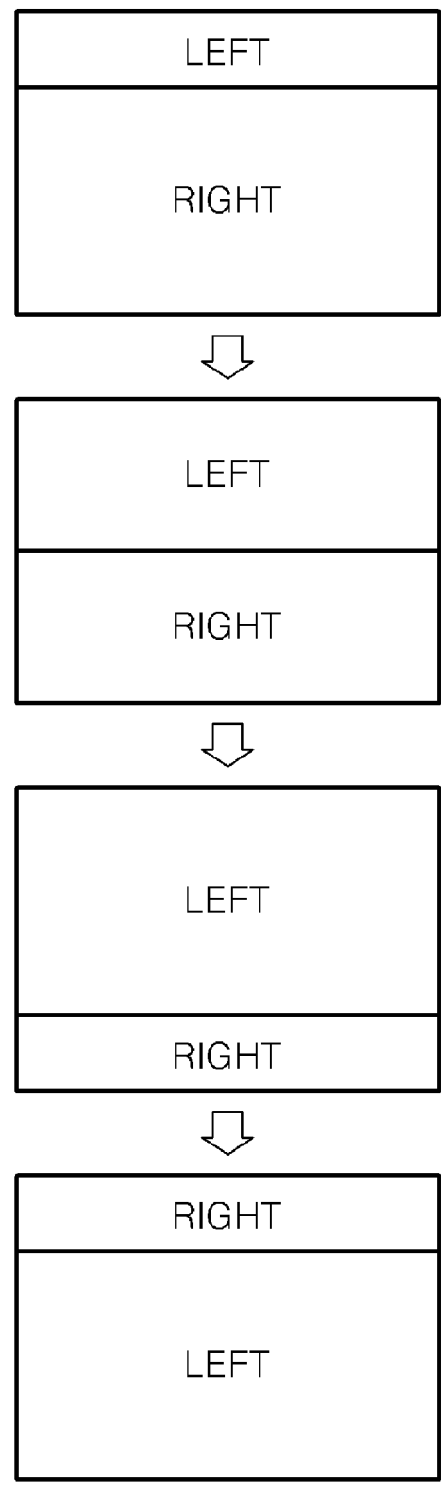
FIG. 4 illustrates processes of displaying left eye images and right eye images in a related art liquid crystal display apparatus.

When both a polarization switch and a display panel use a liquid crystal, light intensities recognized by the left eye and the right eye are different from each other, and cross-talks recognized by the left eye and the right eye are different from each other. FIGS. 3 through 5 are views for explaining the reasons for these problems.

FIG. 3 sequentially illustrates a process of displaying left eye images and right eye images in a related art CRT display apparatus. In the CRT display apparatus, phosphor is instantly emitted using an impulse method. Therefore, as shown in FIG. 3, an instantly displayed image occupies a narrow area in a screen. For example, in the CRT display apparatus, a frame of the left eye image formed as a narrow band shape is scanned from an upper portion to a lower portion of the screen, and then a frame of the right eye image formed as a narrow band shape is scanned from the upper portion to the lower portion of the screen. Therefore, in the CRT display apparatus, differences between the light intensities and the cross-talks of the left eye and the right eye are rarely generated.

On the other hand, unlike the CRT display apparatus that emits light instantly, an LCD apparatus is driven in a hold-type manner, in which the light emission status is maintained while the LCD apparatus is turned on. Therefore, as shown in FIG. 4, when the left eye image of a frame starts to be displayed from the upper portion of the screen, the right eye image of the previous frame still remains on the lower portion of the screen. In addition, a region displaying the left eye image is enlarged gradually, and then the right eye image of the next frame is displayed from the upper portion of the screen.

However, as described above, the liquid crystal is generally not switched from the low level to the high level or from the high level to the low level instantly. Instead it is switched with a predetermined delay. Moreover, the response time of the liquid crystal during the transition from the low level to the high level is faster than the response time during the transition from the high level to the low level.

Figure 5A:
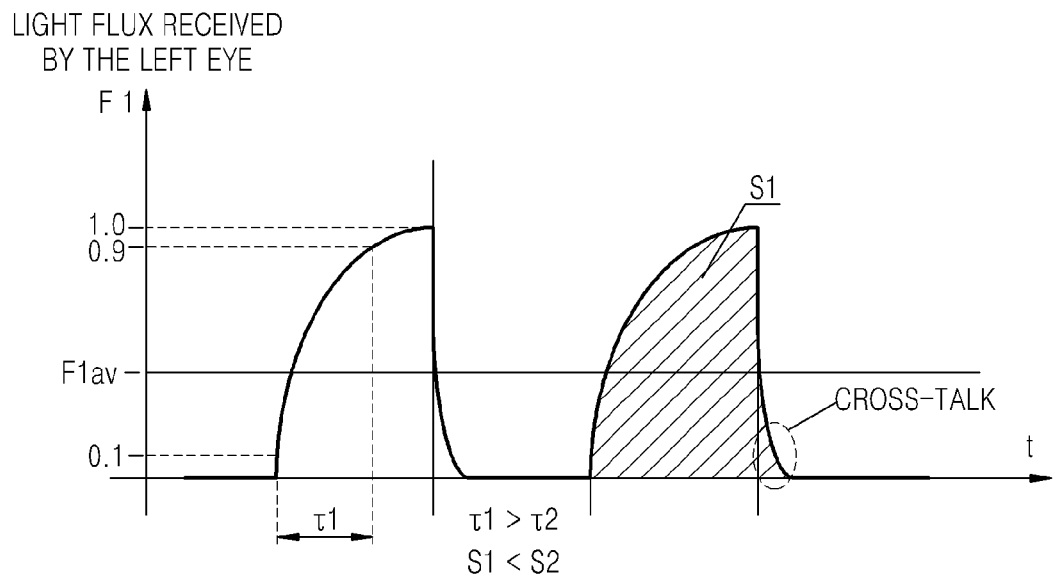
FIGS. 5A, 5B, and 5C are timing diagrams showing a method of driving the related art liquid crystal polarization switch.
Figure 5B:
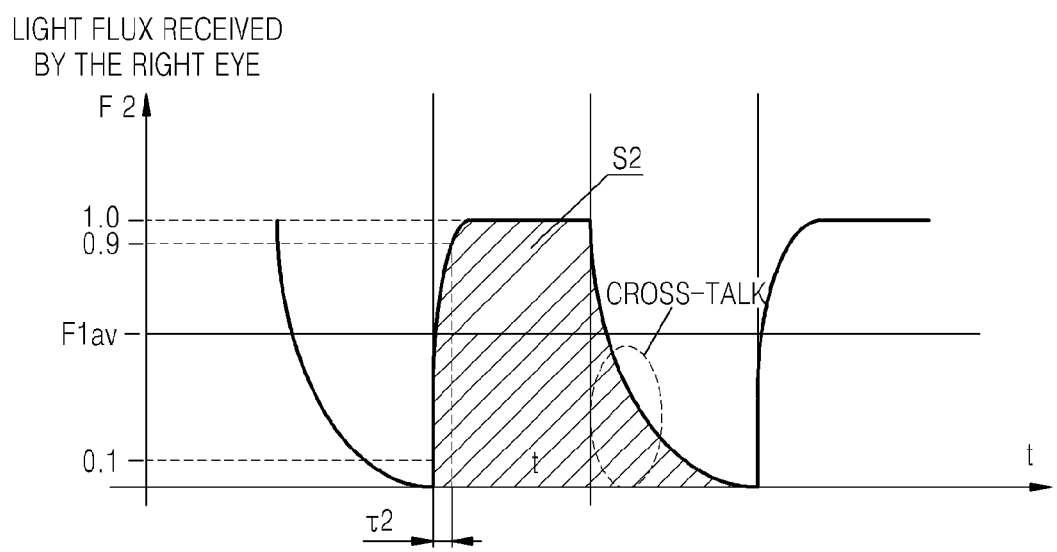
Figure 5C:
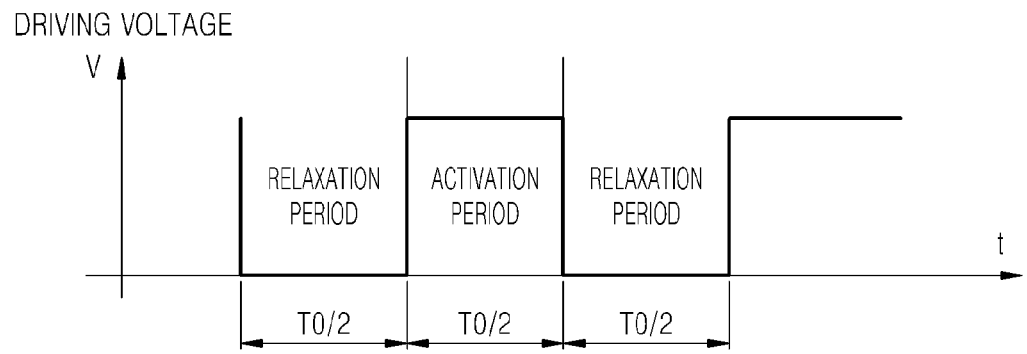

FIG. 5 illustrates an operation of the related art liquid crystal polarization switch. In FIG. 5, it is assumed that when the liquid crystal display panel displays the left eye image, the polarization switch transits to the low level, and when the liquid crystal display panel displays the right eye image, the polarization switch transits to the high level. A period in which the polarization switch is at the low level is called a relaxation period, and a period in which the polarization switch is at the high level is called an activation period. In addition, it is assumed that the time during which the display panel displays the left eye image and the right eye image of a frame is T0. According to the related art, the relaxation period and the activation period are both equal to T0/2. FIG. 5C is a timing diagram showing the driving voltage applied to the liquid crystal polarization switch.

As described above, the response speed of the liquid crystal when the liquid crystal transits from the low level to the high level is faster than the response speed when the liquid crystal transits from the high level to the low level. That is, if the switching time when the liquid crystal transits from the high level to the low level (that is, when the activation period changes to the relaxation period) is τ1, and if the switching time when the liquid crystal transits form the low level to the high level (that is, when the relaxation period changes to the activation period) is τ2, then τ1>τ2. As shown in FIGS. 5A and 5B, τ1 is defined as the time elapsing as the light flux received by the left eye increases from 0.1 to 0.9, and τ2 is defined as the time elapsing as the light flux received by the right eye increases from 0.1 to 0.9. For example, in a case of a related art liquid crystal, τ1 is about 3 ms and τ2 is about 0.3 ms.

A light flux received by the left eye and a light flux received by the right eye are shown in FIGS. 5A and 5B, respectively. That is, FIGS. 5A and 5B illustrate changes of the light fluxes in the left eye and the right eye based on the elapsed time, respectively. The changes of the light fluxes can be obtained by measuring the light intensities passing through the left eye polarization plate 25a and the right eye polarization plate 25b of the polarizing eyeglasses 25 in the stereoscopic image display apparatus of FIG. 2.

First, since the left eye image is displayed when the polarization switch is in the relaxation period, as shown in FIG. 5A, the light flux of the left eye increases gradually up to the peak, and then is rapidly reduced. On the other hand, since the right eye image is displayed when the polarization switch is in the activation period, as shown in FIG. 5B, the light flux of the right eye increases rapidly and remains at the peak level for a predetermined time, and then is gradually reduced. Here, the total light intensity of the left eye corresponds to the hatched area S1 in the graph of FIG. 5A, and the total light intensity of the right eye corresponds to the hatched area S2 in the graph of FIG. 5B. Since the area S2 is greater than the area S1 (S2>S1), an average light flux received by the left eye F1av is smaller than an average light flux received by the right eye F2av. Therefore, the observer thinks that the right eye image is brighter than the left eye image.

In addition, since there is a predetermined time delay when the relaxation period changes to the activation period or the activation period changes to the relaxation period, cross-talk is generated, as denoted by a dotted circle in FIGS. 5A and 5B. That is, in the activation period of the polarization switch, the right eye image partially passes through the left eye polarization plate, and in the relaxation period of the polarization switch, the left eye image partially passes through the right eye polarization plate. Here, since the transition speed from the relaxation period to the activation period is fast and the transition speed from the activation period to the relaxation period is slow, the cross-talk of the right eye is relatively large, and the cross-talk of the left eye is relatively small. It is difficult to prevent the cross-talk from being generated; however, if the cross-talk rate is about 4% or smaller, the cross-talk is rarely recognized. However, as shown in FIGS. 5A and 5B, the cross-talk of the right eye may be 4% or greater, and the cross-talk of the left eye may be 4% or smaller. In this case, the left eye may not observe the cross-talk, while the right eye may observe the cross-talk.

Figure 6A:
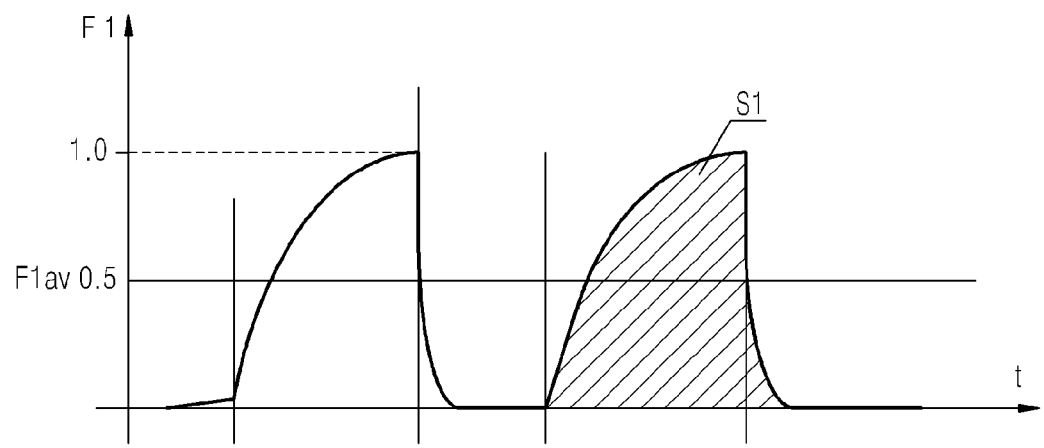
FIGS. 6A, 6B, 6C, 7A, 7B, and 7C are timing diagrams showing a method of driving a liquid crystal polarization switch according to an exemplary embodiment of the present invention.
Figure 6B:
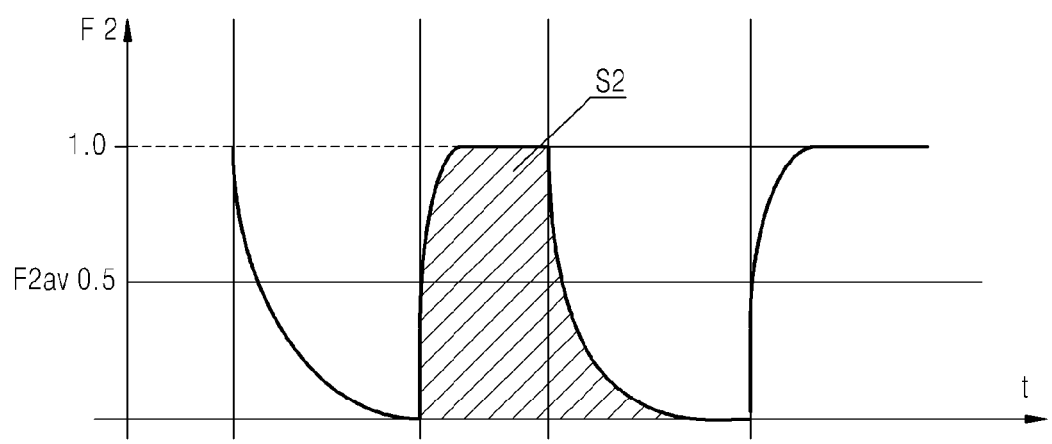
Figure 6C:
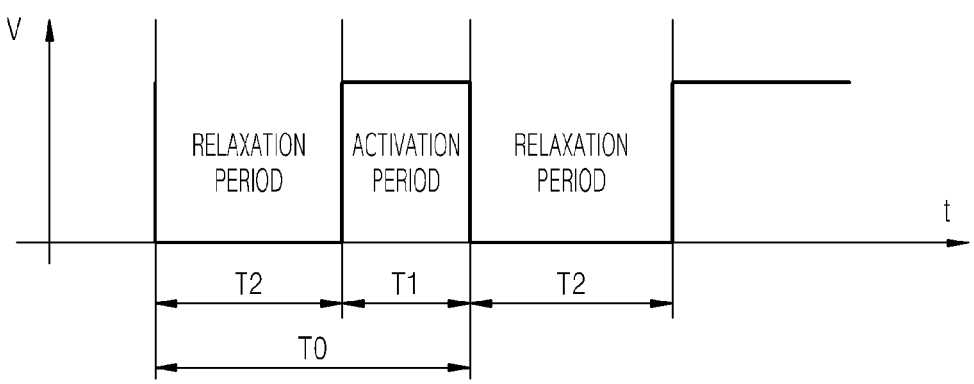

FIG. 6 illustrates a method of driving a polarization switch according to an exemplary embodiment of the present invention. FIG. 6C is a timing diagram of a driving voltage applied to a liquid crystal polarization switch according to the current exemplary embodiment, and FIGS. 6A and 6B show changes of light fluxes received by the left eye and the right eye based on the elapsed time, respectively.

As shown in FIG. 6C, the activation period T1 and the relaxation period T2 are not equal to each other, unlike in the related art. In more detail, the activation period T1 is reduced and the relaxation period T2 is increased, so that the hatched area S1 of FIG. 6A can be increased and the hatched area S2 of FIG. 6B can be reduced. Thus, the areas of S1 and S2 are equal to each other (that is, S1=S2). Therefore, according to exemplary embodiments of the present invention, the activation period T1 is shorter than the relaxation period T2 (T1<T2). However, the entire period T0, which includes the activation period T1 and the relaxation period T2, remains the same, and the periods of displaying the left eye image and the right eye image in the display panel remain the same. The period T0 is a period of displaying the left eye image and the right eye image in a frame by the display panel. For example, in a case where the display panel displays the images at a frequency of 120 Hz, the period T0 is about 16.6 ms, and in a case where the display panel displays the images at a frequency of 60 Hz, the period T0 is about 33.3 ms.

Figure 1:
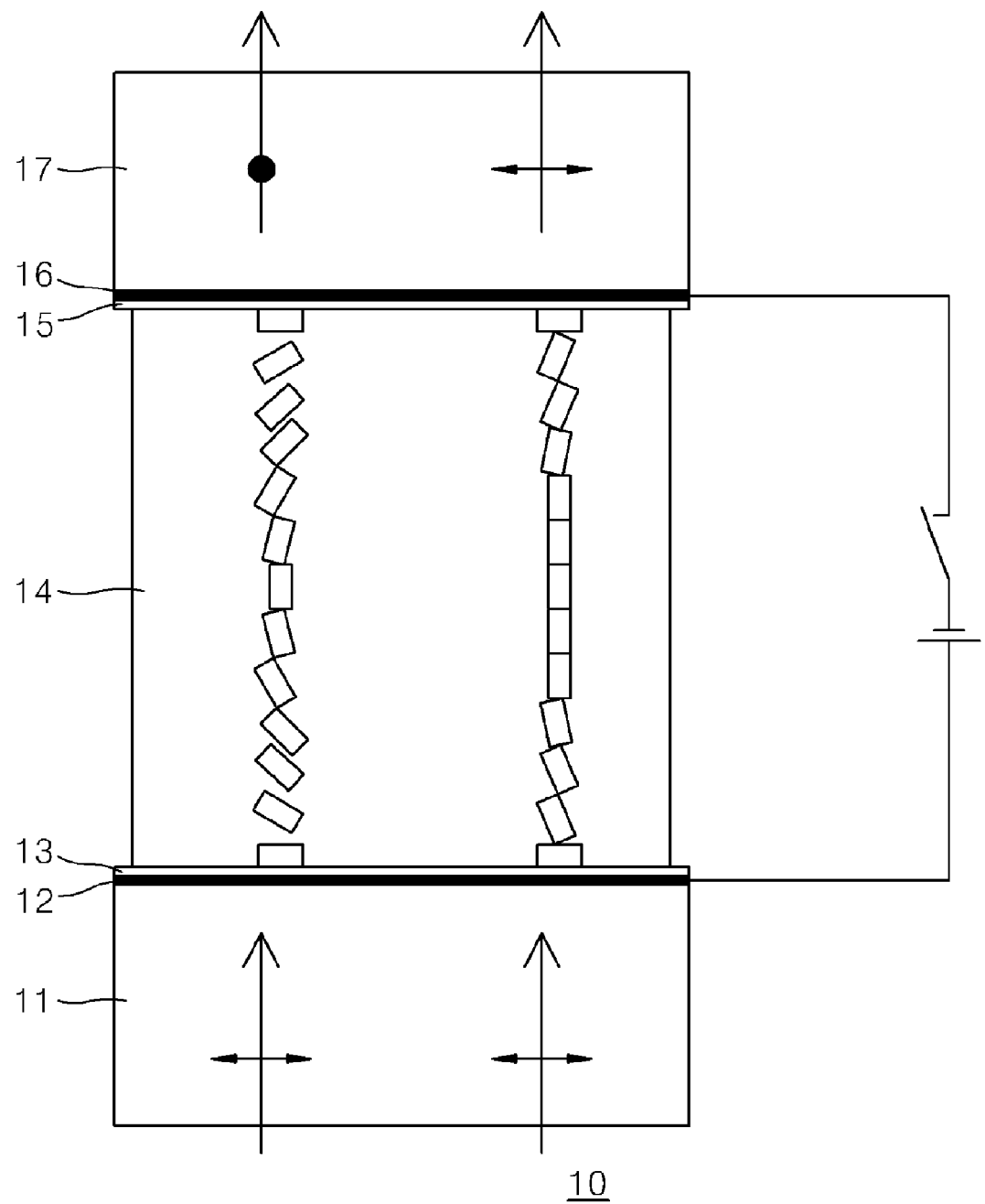
FIG. 1 is a cross-sectional view of a schematic structure of a related art liquid crystal polarization switch.
Figure 2:
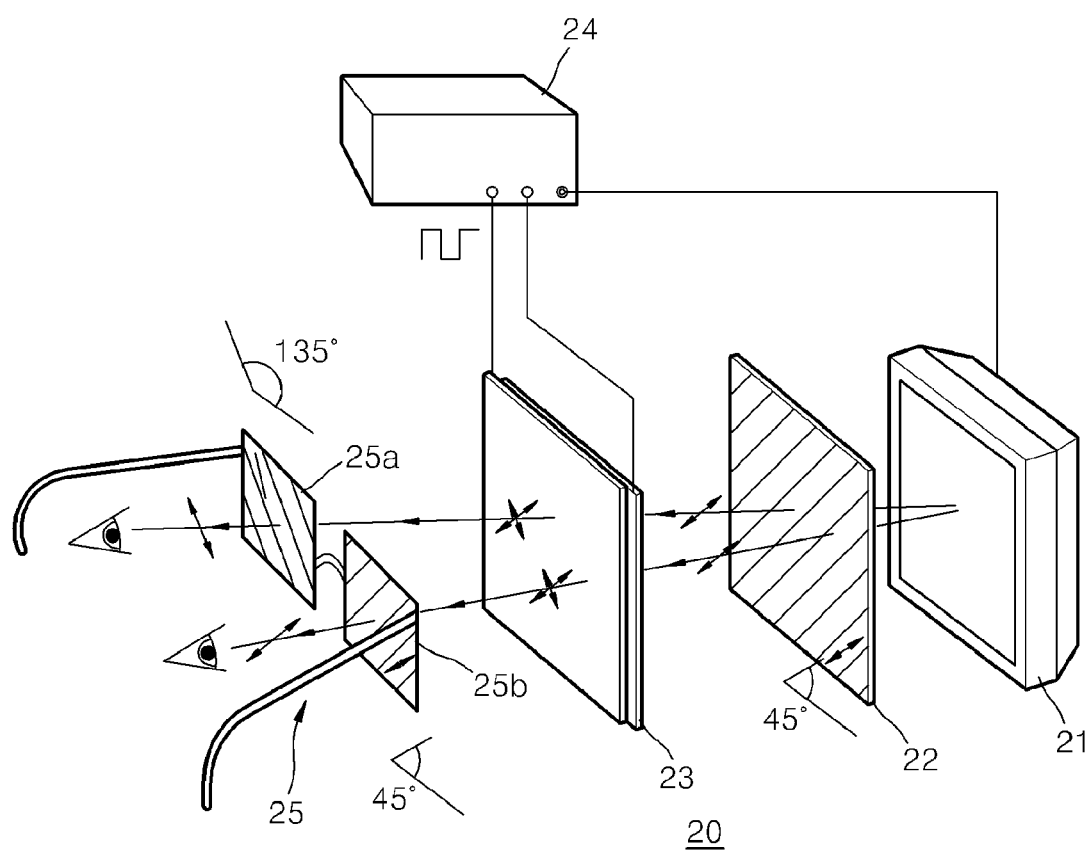
FIG. 2 is a schematic diagram of a related art time-divisional stereoscopic image display apparatus which includes the related art liquid crystal polarization switch of FIG. 1.

According to the current exemplary embodiment, the activation period T1 can be reduced and the relaxation period T2 can be increased until the average light intensities transmitted through the left eye polarization plate 25a and the right eye polarization plate 25b of the polarizing eyeglasses 25 are equal to each other in the stereoscopic image display apparatus of FIG. 2. For example, if a display panel having a displaying frequency of 120 Hz is used, a duty cycle of the activation period T1 may be about 42%. Therefore, in this case, since T1=0.42×T0=7 ms, the activation period T1 is about 7 ms, and since T2=0.58×T0=9.6 ms, the relaxation period T2 is about 9.6 ms. In addition, if a display panel having a displaying frequency of 60 Hz is used, the duty cycle of the activation period T1 may be about 46%. In this case, since T1=0.46×T0=15.3 ms, the activation period T1 is about 15.3 ms, and since T2=0.54×T0=18 ms, the relaxation period T2 is about 18 ms.

Figure 7A:
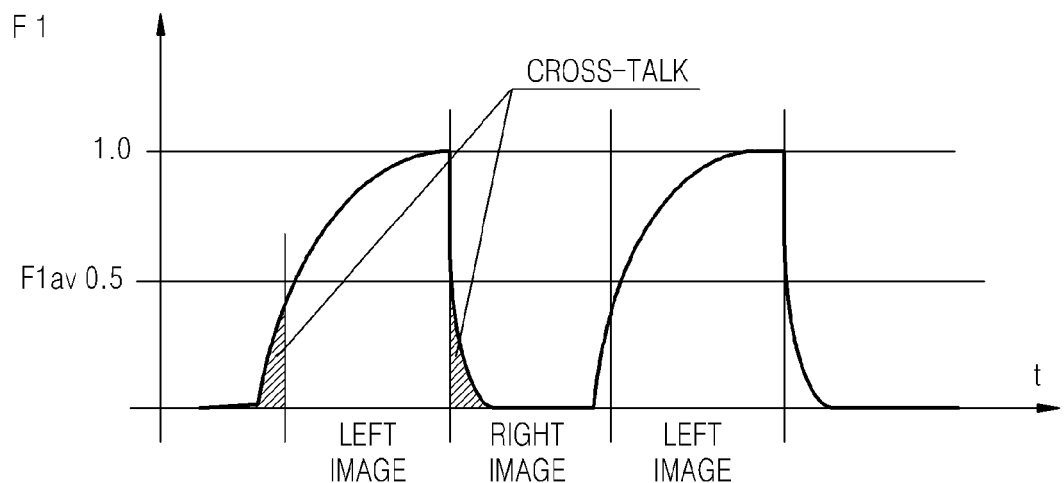
Figure 7B:
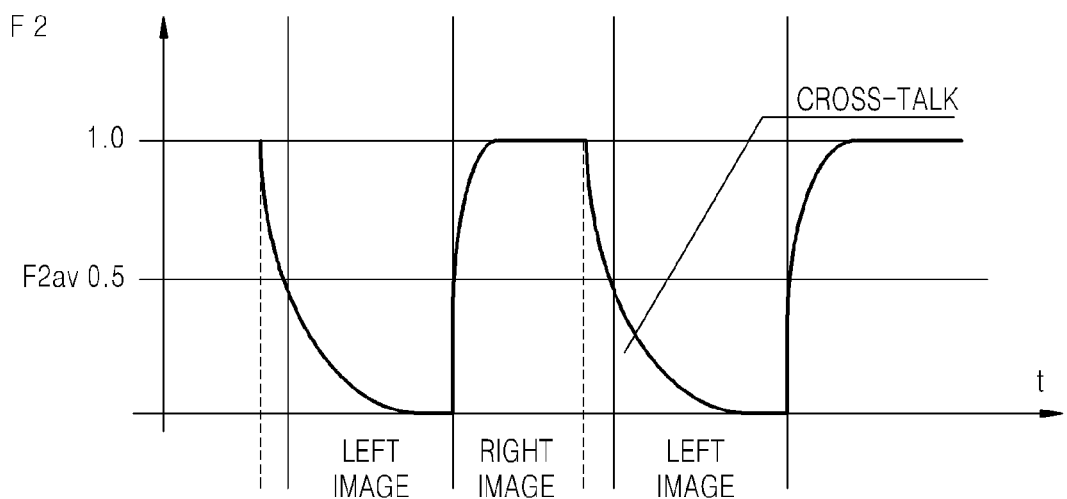
Figure 7C:

In addition, FIG. 7 illustrates a method of driving a polarization switch for reducing the cross-talk according to an exemplary embodiment of the present invention. Here, FIG. 7C illustrates the relaxation period and the activation period of the liquid crystal switch according to the current exemplary embodiment, and FIGS. 7A and 7B illustrate changes of light fluxes received by the left eye and the right eye based on the elapsed time in the current exemplary embodiment, respectively. In addition, FIGS. 7A and 7B show the times of displaying the left eye images and the right eye images.

As described above, the polarization switch is driven so that the activation period is shorter than the relaxation period, according to exemplary embodiments of the present invention. In addition, the entire period of the polarization switch, including the activation period and the relaxation period, is the same as the period of displaying the left eye image and the right eye image in a frame by the display panel. Therefore, if the beginning of the activation period is synchronized with the start of displaying the right eye image, the activation period ends and the relaxation period begins before the display of the right eye image ends, as shown in FIGS. 7A through 7C. In addition, the left eye image starts to be displayed after the relaxation period begins, and the end of the relaxation period is synchronized with the end of the displaying of the left eye image.

A comparison of the graphs of FIG. 5A and FIG. 7A shows that the cross-talk of the left eye is increased with respect to the related art. However, a comparison of the graphs of FIG. 6B and FIG. 7B shows that the cross-talk of the right eye is smaller than that of the related art. Therefore, according to exemplary embodiments of the present invention, the cross-talks of the right eye and the left eye can be equal to each other. For example, according to the related art, the cross-talk rate of the right eye is 4.5% and the cross-talk rate of the left eye is 1.5%, and thus the viewer may recognize the cross-talk from the right eye. However, according to exemplary embodiments of the present invention, the cross-talk rates of the left and right eyes are both 3%, which is smaller than 4%. Thus, the viewer cannot recognize the cross-talk from either eye.

Figure 8A:
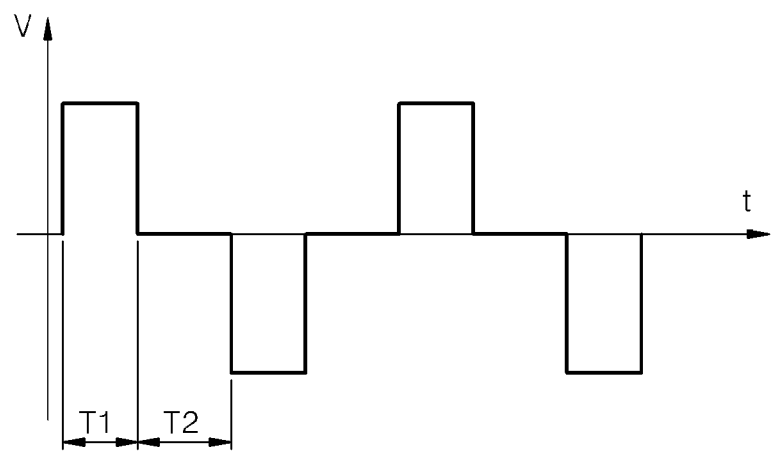
FIGS. 8A, 8B, and 8C are timing diagrams showing driving voltages for driving the liquid crystal polarization switch of FIGS. 6A, 6B, 6C, 7A, 7B, and 7C, according to an exemplary embodiment of the present invention.
Figure 8B:
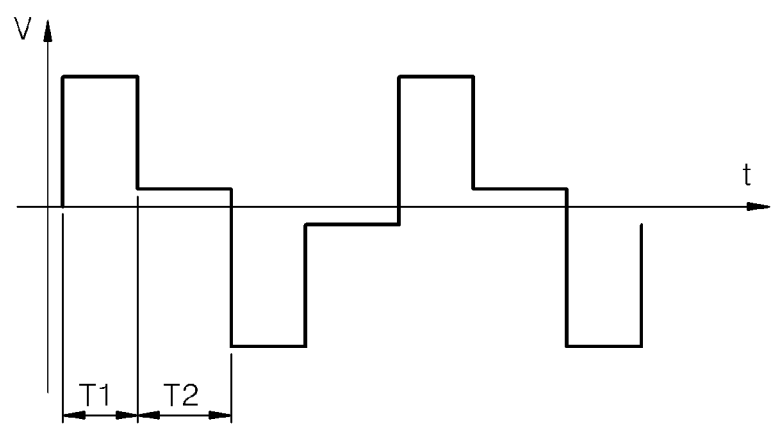
Figure 8C:
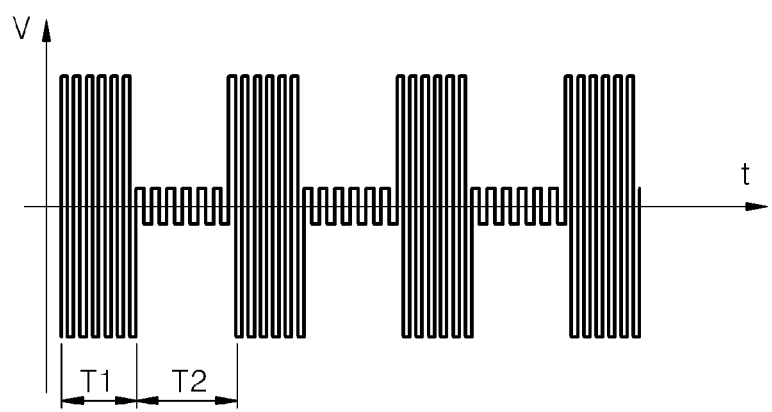

On the other hand, FIGS. 8A through 8C are timing diagrams showing examples of a driving voltage for the polarization switch for performing the driving method of exemplary embodiments of the present invention. In FIG. 8A, a positive voltage and a negative voltage are repeatedly applied to the polarization switch in the activation period T1, and no voltage is applied to the polarization switch in the relaxation period T2. Alternatively, referring to FIG. 8B, a bias voltage is applied to the polarization switch in the relaxation period T2. In FIG. 8C, a large pulse wave is applied to the polarization switch in the activation period T1, and a small pulse wave is applied to the polarization switch in the relaxation period T2. According to exemplary embodiments of the present invention, the activation period T1 in which the voltage is applied to the polarization switch is relatively short, and the relaxation period T2 in which no voltage is applied to the polarization switch or a small bias voltage is applied to the polarization switch is relatively long, as shown in FIGS. 8A through 8C.

According to exemplary embodiments of the present invention, in the stereoscopic image display apparatus using a liquid crystal polarization switch and a hold-type display panel such as an LCD panel, the activation period of the polarization switch is shorter than the relaxation period of the polarization switch, and thus the light intensities recognized by the left eye and the right eye of the viewer can be equal to each other, and the cross-talks recognized by the left and right eyes of the viewer can be equal to each other.

Although the time-divisional stereoscopic image display apparatus using the polarizing eyeglasses has been described as an example in the present invention, the method of driving the polarization switch according to exemplary embodiments of the present invention can be applied to other stereoscopic image display apparatuses employing a liquid crystal polarization switch as the polarization switch and the hold-type display panel as the display panel.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents.

What is claimed is:

1. A method of driving a polarization switch in a display apparatus comprising a display panel which alternately displays first viewing point images in a first period and second viewing point images in a second period in a time-divisional manner, and a polarization switch which provides the first viewing point images and the second viewing point images with different polarization directions from each other, the method comprising:
    applying a voltage to the polarization switch during an activation period in order for the first viewing point images to have a first polarization direction; and
    applying no voltage to the polarization switch or applying a bias voltage to the polarization switch during a relaxation period in order for the second viewing point images to have a second polarization direction different from the first polarization direction,
    wherein the activation period of the polarization switch is shorter than the relaxation period of the polarization switch, and
    the bias voltage is smaller than the applied voltage.

2. The method of claim 1, wherein a total period comprises the activation period and the relaxation period, and the total period is equal to a period of displaying a frame of the first viewing point image and a frame of the second viewing point image.

3. The method of claim 2, wherein:
    a beginning of the activation period is synchronized with a start of displaying the first viewing point image;
    the activation period ends and the relaxation period begins before an end of displaying the first viewing point image; and
    an end of the relaxation period is synchronized with an end of displaying the second viewing point image.

4. The method of claim 1, further comprising selecting the activation period and the relaxation period so that an average light intensity recognized by a left eye of a viewer equals an average light intensity recognized by a right eye of the viewer.

5. The method of claim 4, further comprising selecting the activation period and the relaxation period so that an average cross-talk recognized by the left eye equals an average cross-talk recognized by the right eye.

6. The method of claim 4, wherein the polarization switch is a liquid crystal polarization switch.

7. A display apparatus comprising:
    a display panel which alternately displays first viewing point images in a first period and second viewing point images in a second period in a time-divisional manner;
    a polarization switch which provides the first viewing point images and the second viewing point images with different polarization directions from each other; and
    a pulse generator which generates a driving voltage which drives the polarization switch,
    wherein an activation period of the polarization switch is shorter than a relaxation period of the polarization switch,
    a voltage is applied to the polarization switch during the activation period in order for the first viewing point images to have a first polarization direction,
    no voltage is applied to the polarization switch or a bias voltage is applied to the polarization switch during the relaxation period in order for the second viewing point images to have a second polarization direction different from the first polarization direction, and
    the bias voltage is smaller than the applied voltage.

8. The display apparatus of claim 7, wherein a total period comprises the activation period and the relaxation period, and the total period is equal to a period of displaying a frame of the first viewing point image and a frame of the second viewing point image.

9. The display apparatus of claim 8, wherein:
    a beginning of the activation period is synchronized with a start of displaying the first viewing point image;
    the activation period ends and the relaxation period begins before an end of displaying the first viewing point image; and
    an end of the relaxation period is synchronized with an end of displaying the second viewing point image.

10. The display apparatus of claim 7, wherein the activation period and the relaxation period are selected so that an average light intensity recognized by a left eye of a viewer equals an average light intensity recognized by a right eye of the viewer.

11. The display apparatus of claim 10, wherein the activation period and the relaxation period are selected so that an average cross-talk recognized by the left eye equals an average cross-talk recognized by the right eye.

12. The display apparatus of claim 10, wherein the polarization switch is a liquid crystal polarization switch.

13. The display apparatus of claim 10, wherein the display panel is a hold-type display panel.

* * * * *